US009195257B2

(12) United States Patent
Miyahara et al.

(10) Patent No.: US 9,195,257 B2
(45) Date of Patent: Nov. 24, 2015

(54) STEERING WHEEL

(75) Inventors: Kunitomo Miyahara, Wako (JP); Takashi Kondou, Wako (JP); Yukihiro Kunitake, Wako (JP); Keisuke Onohara, Tokyo (JP); Takashi Wakai, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 306 days.

(21) Appl. No.: 13/885,895

(22) PCT Filed: Nov. 16, 2011

(86) PCT No.: PCT/JP2011/076354
§ 371 (c)(1),
(2), (4) Date: Jun. 1, 2013

(87) PCT Pub. No.: WO2012/067131
PCT Pub. Date: May 24, 2012

(65) Prior Publication Data
US 2013/0239739 A1     Sep. 19, 2013

(30) Foreign Application Priority Data
Nov. 19, 2010   (JP) .................. 2010-258659

(51) Int. Cl.
*B60R 21/16*   (2006.01)
*G05G 1/10*    (2006.01)
*B60R 21/203*  (2006.01)

(52) U.S. Cl.
CPC .............. *G05G 1/10* (2013.01); *B60R 21/2037* (2013.01); *Y10T 74/20834* (2015.01)

(58) Field of Classification Search
USPC ............ 180/731; 188/378, 379, 380; 280/731
See application file for complete search history.

(56) References Cited

U.S. PATENT DOCUMENTS

| 5,380,037 | A  | * | 1/1995  | Worrell et al. ............. 280/728.2 |
| 6,062,592 | A  | * | 5/2000  | Sakurai et al. ............. 280/728.2 |
| 7,464,959 | B2 | * | 12/2008 | Pillsbury et al. ............. 280/731 |
| 8,286,766 | B2 | * | 10/2012 | Terada et al. ................. 188/379 |
| 8,720,942 | B2 | * | 5/2014  | Onohara ....................... 280/731 |
| 8,794,662 | B2 | * | 8/2014  | Ishii et al. .................... 280/731 |
| 2002/0113419 | A1 | * | 8/2002 | Kai et al. ...................... 280/731 |

(Continued)

FOREIGN PATENT DOCUMENTS

| EP | 2 085 290    | 8/2009 |
| JP | 04-262965    | 9/1992 |
| JP | 2009-202859  | 9/2009 |

(Continued)

*Primary Examiner* — Toan To
(74) *Attorney, Agent, or Firm* — Rankin, Hill & Clark LLP

(57) ABSTRACT

There is provided a steering wheel that can reduce the load applied to an elastic body included in a dynamic damper to lengthen the life of the dynamic damper, and that allows the frequency of the dynamic damper to be adjusted easily. An insulator 14 includes a first flange portion 14a provided between a stopper 13 and an elastic body 15, and a second flange portion 14b provided between a coil spring 17 and the elastic body 15. The elastic body 15 includes a first diameter-increased portion 15a increased in diameter to be contactable with the first flange portion 14a, and a second diameter-increased portion 15b increased in diameter to be contactable with the second flange portion 14b. A contact surface of the first flange portion 14a with the first diameter-increased portion 15a has a plurality of linear projections 14c arranged in a substantially radial fashion.

8 Claims, 9 Drawing Sheets

(56) References Cited

U.S. PATENT DOCUMENTS

| | | | |
|---|---|---|---|
| 2004/0090052 A1* | 5/2004 | Sugimoto | 280/731 |
| 2006/0028002 A1* | 2/2006 | Tsujimoto et al. | 280/731 |
| 2009/0218739 A1 | 9/2009 | Terada et al. | |
| 2010/0219621 A1* | 9/2010 | Sasaki et al. | 280/731 |
| 2011/0120258 A1* | 5/2011 | Kondo et al. | 74/552 |

FOREIGN PATENT DOCUMENTS

| | | |
|---|---|---|
| JP | 2009-262785 | 11/2009 |
| JP | 2011-110941 | 6/2011 |

\* cited by examiner

STEERING WHEEL

TECHNICAL FIELD

The present invention relates to a steering wheel for steering a vehicle such as an automobile, and more particularly, to a steering wheel provided with a dynamic damper.

BACKGROUND ART

There is known a steering wheel for steering a vehicle such as an automobile, which includes a main body assembled on a steering shaft that converts a rotating action to a steering action, and a pad unit provided at almost the center of the main body. The pad unit is assembled to the main body in a manner such as to be movable in an axial direction of the steering shaft, and a horn switch is formed between the main body and the pad unit (for example, see PTL 1 and PTL 2).

For example, an assembly structure for such a steering wheel includes a first horn plate fixed to the main body, guide pins standing on the first horn plate, stoppers provided at distal ends of the guide pins, a second horn plate fixed to the pad unit and provided slidably along the guide pins, coil springs provided along the guide pins to bias the second horn plate in a direction to bring the second horn plate into contact with the stoppers, and elastic bodies provided between the coil springs and the second horn plate.

By thus interposing the elastic bodies between the coil springs and the horn plate, a dynamic damper is configured to adjust the natural frequency of the pad unit serving as a mass body and to cancel and damp vibration transmitted from the main body by resonance of the pad unit.

CITATION LIST

Patent Literature

PTL 1: Japanese Unexamined Patent Application Publication No. 4-262965
PTL 2: Japanese Unexamined Patent Application Publication No. 2009-202859

SUMMARY OF INVENTION

Technical Problem

In the above-described steering wheel described in PTL 1, the elastic bodies are constantly biased by the coil springs via guide walls connected to the horn plate. Therefore, these elastic bodies are constantly compressed. Consequently, the elastic bodies are susceptible to fatigue, and it is difficult to lengthen the life of the elastic bodies.

In the above-described steering wheel described in PTL 2, the elastic bodies are connected to the horn plate, sliders for guiding the elastic bodies are provided on inner sides of the elastic bodies, and the sliders are constantly biased by the coil springs. Therefore, these elastic bodies are subjected to loads every time the sliders move up and down, and cause abrasion between the elastic bodies and the horn plate. Consequently, the elastic bodies are susceptible to fatigue, and it is difficult to lengthen the life of the elastic bodies.

After the dynamic dampers used in these steering wheels are individually subjected to repetitive trial productions and tests according to the type of the automobile or the type of the steering wheel, the shapes thereof are set finally. At this time, on the basis of the test results, the thickness and elastic modulus of the elastic bodies, the elastic modulus of the coil springs, etc. are changed to adjust the frequency of the dynamic dampers. Depending on the structure of the dynamic damper, desired frequency adjustment cannot be performed only by changing the thickness and elastic modulus of the elastic bodies, and the structure of the dynamic damper itself is frequently forced to be changed.

The present invention has been made in view of such problems, and an object of the invention is to provide a steering wheel that can reduce the load applied to an elastic body included in a dynamic damper to lengthen the life of the dynamic damper, and that allows the frequency of the dynamic damper to be adjusted easily.

Solution to Problem

The present invention provides a steering wheel including a main body assembled on a steering shaft for converting a rotating action into a steering action, and a pad unit provided at almost the center of the main body. The pad unit is assembled to the main body such as to be movable in an axis direction of the steering shaft, and a horn switch is provided between the main body and the pad unit. The steering wheel includes a first horn plate fixed to the main body, a second horn plate fixed to the pad unit, a guide pin standing on one of the first horn plate and the second horn plate, a stopper provided at a distal end of the guide pin, an insulator inserted slidably along the guide pin, an elastic body fitted on an outer periphery of the insulator, a protector fitted on an outer periphery of the elastic body and provided engageably with the other of the first horn plate and the second horn plate, and a coil spring fitted on the guide pin to bias the insulator toward the stopper. The insulator includes a first flange portion provided between the stopper and the elastic body, and a second flange portion provided between the coil spring and the elastic body. The elastic body includes a first diameter-increased portion increased in diameter to be contactable with the first flange portion, and a second diameter-increased portion increased in diameter to be contactable with the second flange portion. A contact surface of the first flange portion with the first diameter-increased portion has a plurality of linear projections arranged in a substantially radial fashion.

An amplitude or frequency produced by vibration of the pad unit may be controlled by adjusting any of radial widths of the first flange portion and the first diameter-increased portion, a thickness of the first diameter-increased portion, a number, a length, a height, and a width of the linear projections.

Radial widths of the first flange portion and the first diameter-increased portion may include parts larger than radial widths of the second flange portion and the second diameter-increased portion.

A contact surface of the second flange portion with the second diameter-increased portion may have a plurality of dot-shaped projections. Further, a surface of the first flange portion close to the stopper may have a plurality of irregularities.

The insulator may be divided into a first insulator including the first flange portion and a first leg portion extending from the first flange portion toward the second flange portion and provided along the guide pin, and a second insulator including the second flange portion and a second leg portion extending from the second flange portion toward the first flange portion and provided along the guide pin.

The protector may include an expanded portion expanded to be contactable with the first diameter-increased portion and a columnar projection standing on a surface of the expanded portion, and the first flange portion and the first diameter-increased portion may have indentations engageable with the columnar projection.

The protector may have, on an outer peripheral surface, a claw engageable with the first horn plate or the second horn plate, and the expanded portion, the first flange portion, and the first diameter-increased portion may have cutouts through which the claw engaged with the first horn plate or the second horn plate is visible.

The first flange portion and the second flange portion may have through holes through which the assembled elastic body is visible.

Advantageous Effects of Invention

According to the above-described steering wheel of the present invention, the elastic body is out of direct contact with the stopper of the guide pin, the first horn plate or the second horn plate, and the coil spring. This can reduce the load applied to the elastic body and abrasion, and can lengthen the life of the dynamic damper. Further, since the contact between the insulator and the elastic body is made using the linear projections, a frictional force can be effectively produced between the insulator and the elastic body. In addition, by adjusting the contact area between the insulator and the elastic body, the frictional force produced between the insulator and the elastic body can be easily adjusted, and the frequency of the dynamic damper can be adjusted easily.

By adjusting any of the radial widths of the first flange portion and the first diameter-increased portion, the thickness of the first diameter-increased portion, and the number, length, height, and width of the linear projections, the frictional force produced between the insulator and the elastic body can be easily adjusted, the amplitude or frequency produced by vibration of the pad unit can be adjusted, and the frequency of the dynamic damper can be adjusted easily.

By making the first flange portion and the first diameter-increased portion larger than the second flange portion and the second diameter-increased portion, a wide area of the first flange portion that has a great influence on the damper performance can be ensured, and a necessary frictional force can be produced between the insulator and the elastic body.

By forming a plurality of dot-shaped projections on the contact surface of the second flange portion with the second diameter-increased portion, a frictional force can be produced between the insulator and the elastic body in the second flange portion. This can help the frictional force produced in the first flange portion.

By forming a plurality of irregularities on the surface of the first flange portion close to the stopper, the first flange portion can be restricted from sticking to the guide pin, a washer, etc., and this can suppress the occurrence of abnormal noise and breakage of the insulator.

By being divided into the first insulator and the second insulator, the insulator can be assembled easily. Further, the contact of the leg portion of the second insulator with the stopper can reduce the load applied to the elastic body.

By forming the columnar projection on the protector and forming the indentations engageable with the columnar projection in the insulator and the elastic body, rotations of the insulator and the elastic body can be restricted, and abrasion of the insulator and the elastic body can be suppressed.

By forming the claw engageable with the horn plate on the outer peripheral surface of the protector and forming the cutouts in the insulator and the elastic body, the claw engaged with the horn plate is made visible, and the assembly state can be checked easily.

By forming the through holes in the first flange portion and the second flange portion of the insulator, the elastic body assembled to the insulator is made visible, and the assembly state can be checked easily.

BRIEF DESCRIPTION OF DRAWINGS

FIG. 2 includes enlarged views of a dynamic damper in the first embodiment, wherein

FIG. 3 includes detailed views of a first insulator illustrated in FIG. 1, wherein

FIG. 4 includes detailed views of a second insulator illustrated in FIG. 1, wherein

FIG. 5 includes detailed views of an elastic body illustrated in FIG. 1, wherein

FIG. 6 includes detailed views of a protector illustrated in FIG. 1, wherein

FIG. 7 includes views illustrating assembly steps of the dynamic damper illustrated in FIG. 1, wherein

FIG. 8 includes detailed views of a first horn plate illustrated in FIG. 1, wherein

FIG. 9 includes views of steering wheels according to other embodiments of the present invention, wherein

DESCRIPTION OF EMBODIMENTS

Figure 1:
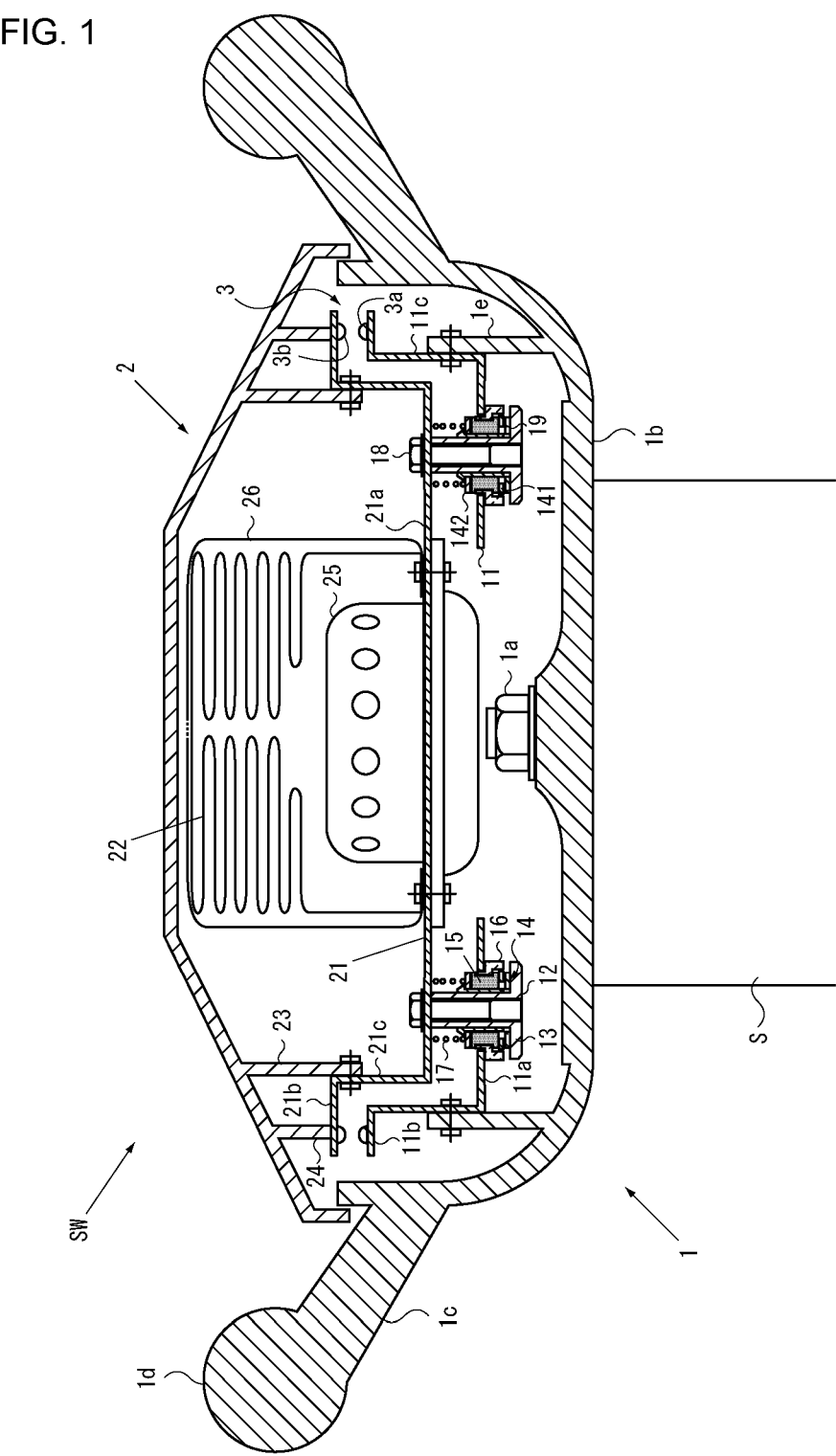
FIG. 1 is a cross-sectional view of a steering wheel according to a first embodiment of the present invention.
Figure 2A:
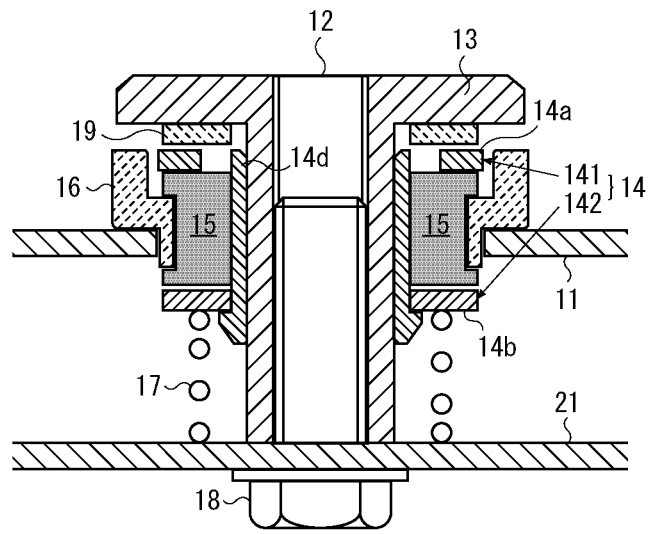
FIG. 2(A) illustrates a normal state.
Figure 2B:
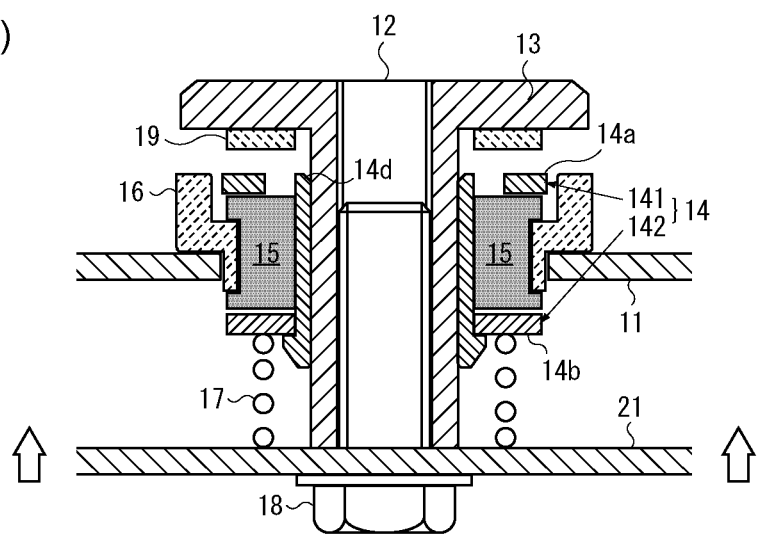
FIG. 2(B) illustrates a state when a horn is sounded.
Figure 3A:
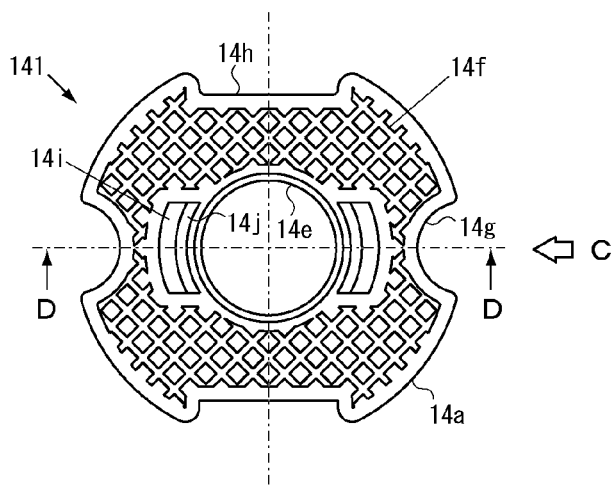
FIG. 3(A) is a plan view.
Figure 3B:
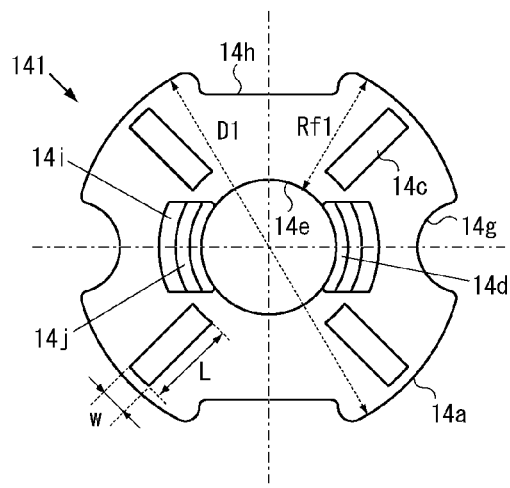
FIG. 3(B) is a back view.
Figure 3C:
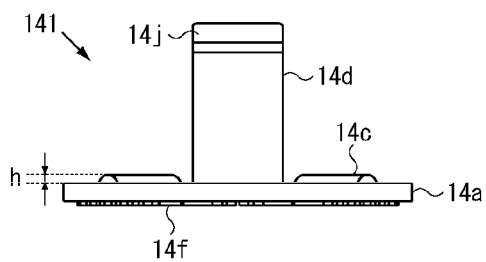
FIG. 3(C) is a view on arrow C of FIG. 3(A)
Figure 3D:
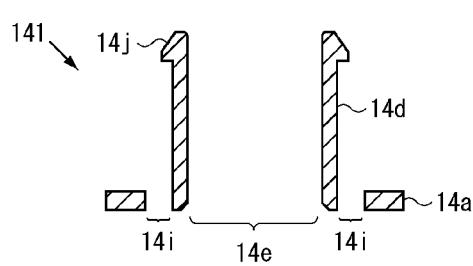
FIG. 3(D) is a cross-sectional view taken along line D-D of FIG. 3(A).
Figure 4A:
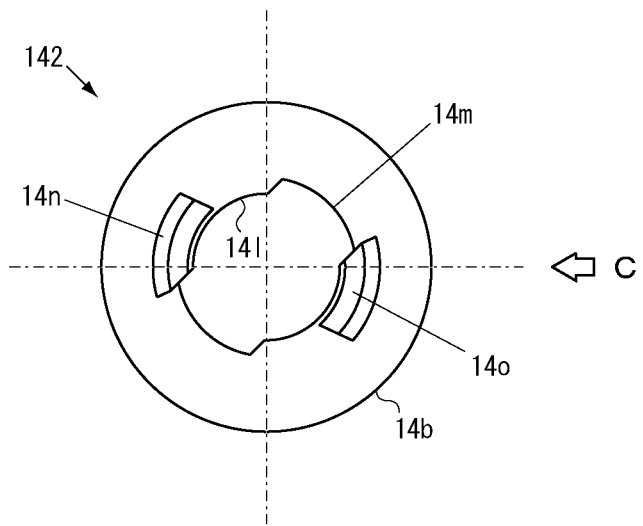
FIG. 4(A) is a plan view.
Figure 4B:
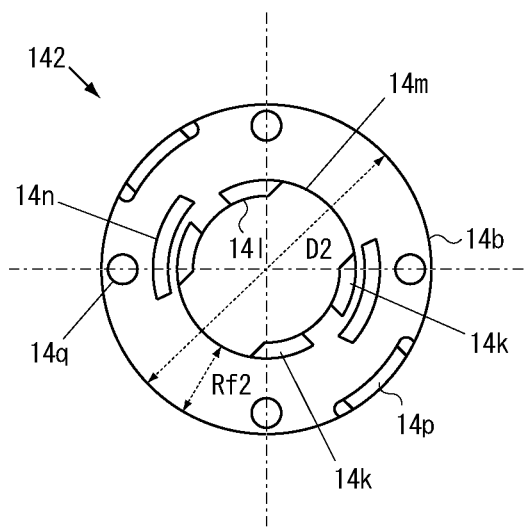
FIG. 4(B) is a back view.
Figure 4C:
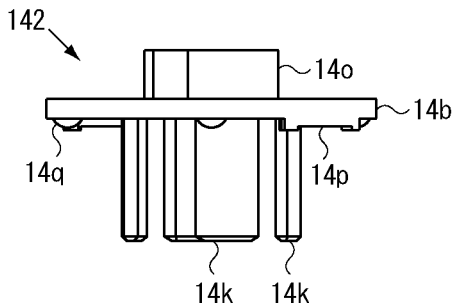
FIG. 4(C) is a view on arrow C of FIG. 4(A).
Figure 5A:
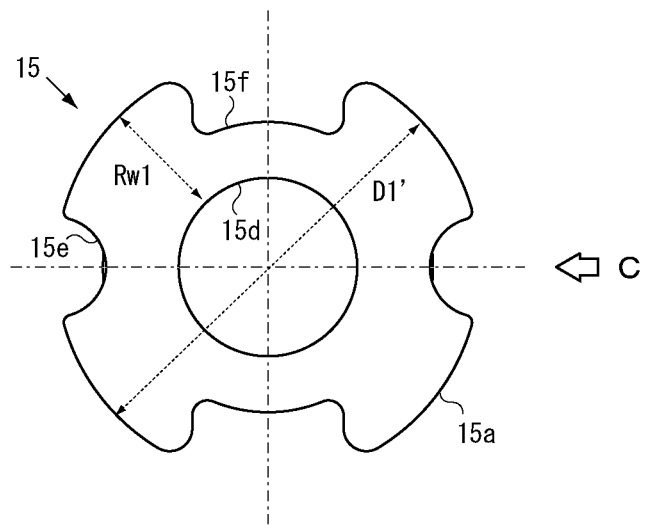
FIG. 5(A) is a plan view.
Figure 5B:
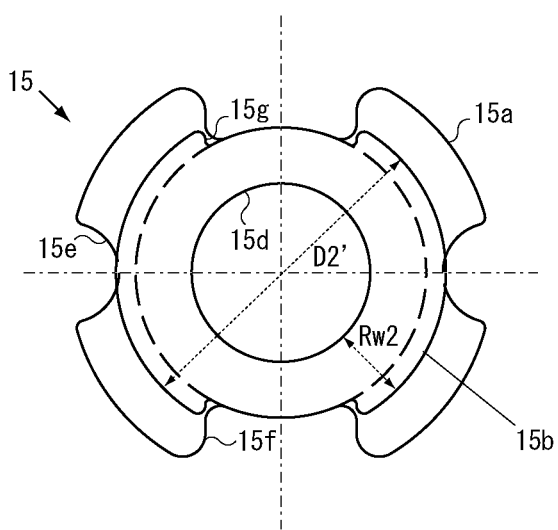
FIG. 5(B) is a back view.
Figure 5C:
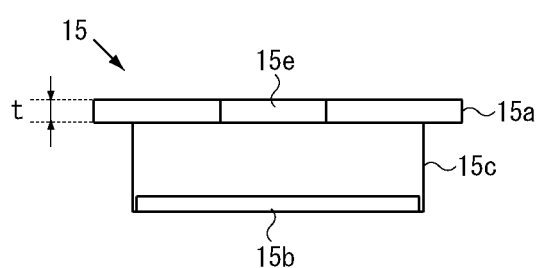
FIG. 5(C) is a view on arrow C of FIG. 5(A).
Figure 6A:
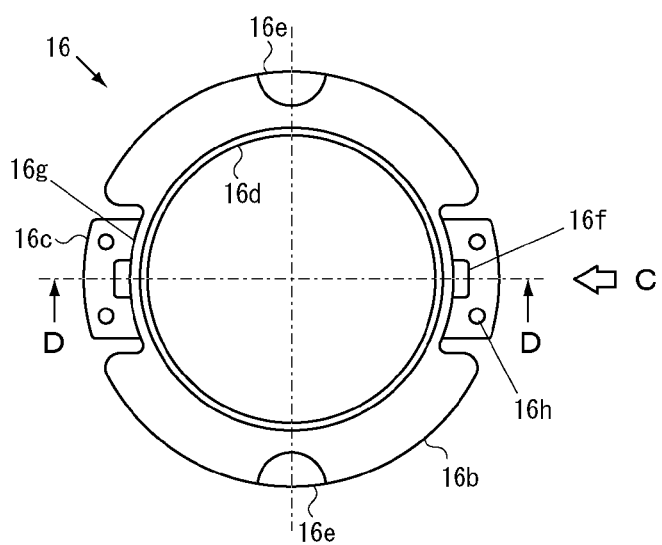
FIG. 6(A) is a plan view.
Figure 6B:
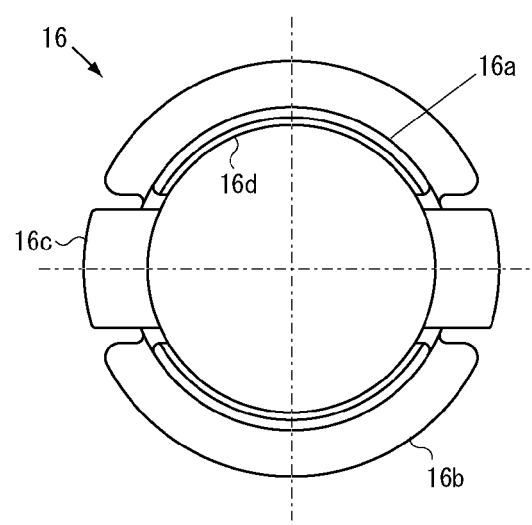
FIG. 6(B) is a back view.
Figure 6C:
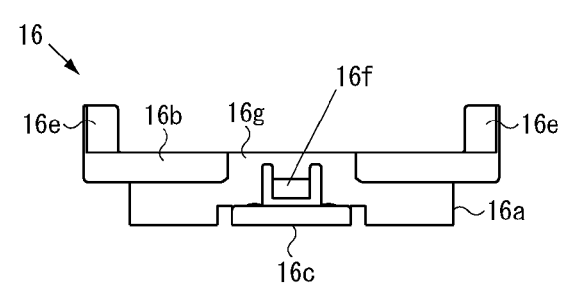
FIG. 6(C) is a view on arrow C of FIG. 6(A)
Figure 6D:
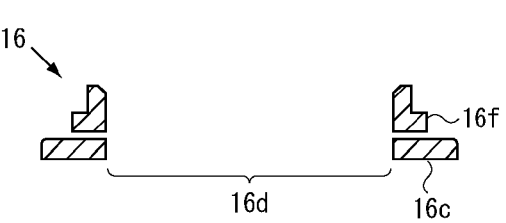
FIG. 6(D) is a cross-sectional view taken along line D-D of FIG. 6(A).

Embodiments of the present invention will be described below with reference to FIGS. 1 to 9. Here, FIG. 1 is a cross-sectional view of a steering wheel according to a first embodiment of the present invention. FIG. 2 includes enlarged views of a dynamic damper in the first embodiment, wherein FIG. 2(A) illustrates a normal state and FIG. 2(B) illustrates a state when a horn is sounded. FIG. 3 includes detailed views of a first insulator illustrated in FIG. 1, wherein FIG. 3(A) is a plan view, FIG. 3(B) is a back view, FIG. 3(C) is a view on arrow C of FIG. 3(A), and FIG. 3(D) is a cross-sectional view taken along line D-D of FIG. 3(A). FIG. 4 includes detailed views of a second insulator illustrated in FIG. 1, wherein FIG. 4(A) is a plan view, FIG. 4(B) is a back view, and FIG. 4(C) is a view on arrow C of FIG. 4(A). FIG. 5 includes detailed views of an elastic body illustrated in FIG. 1, wherein FIG. 5(A) is a plan view, FIG. 5(B) is a back view, and FIG. 5(C) is a view on arrow C of FIG. 5(A). FIG. 6 includes detailed views of a protector illustrated in FIG. 1, wherein FIG. 6(A) is a plan view, FIG. 6(B) is a back view, FIG. 6(C) is a view on arrow C of FIG. 6(A), and FIG. 6(D) is a cross-sectional view taken along line D-D of FIG. 6(A).

As illustrated in FIGS. 1 to 6, the steering wheel according to the first embodiment of the present invention is a steering wheel SW including a main body 1 assembled on a steering shaft S for converting a rotating action into a steering action, and a pad unit 2 provided at almost the center of the main body 1. The pad unit 2 is assembled to the main body 1 in a manner such as to be movable in an axial direction of the steering shaft S, and a horn switch 3 is provided between the main body 1 and the pad unit 2. The steering wheel SW further includes a first horn plate 11 fixed to the main body 1, a second horn plate 21 fixed to the pad unit 2, guide pins 12 standing on the second horn plate 21, stoppers 13 provided at distal ends of the guide pins 12, insulators 14 fitted slidably along the guide pins 12, elastic bodies 15 fitted on outer peripheries of the insulators 14, protectors 16 fitted on outer peripheries of the elastic bodies 15 and being engageable with the first horn plate 11, and coil springs 17 fitted on the guide pins 12 to bias the insulators 14 toward the stoppers 13. The insulators 14 include first flange portions 14a provided between the stoppers 13 and the elastic bodies 15 and second flange portions 14b provided between the coil springs 17 and the elastic bodies 15. The elastic bodies 15 include first diameter-increased portions 15a that are increased in diameter to be contactable with the first flange portions 14a, and second diameter-increased portions 15b that are increased in diameter to be contactable with the second flange portions 14b. Contact surfaces of the first flange portions 14a with the first diameter-increased portions 15a have a plurality of linear projections 14c arranged in a substantially radial fashion.

As illustrated in FIG. 1, the main body 1 includes a boss portion 1b fixed to the steering shaft S by a fixture 1a, a plurality of spoke portions 1c extending from the boss portion 1b in a radial direction, and an annular rim portion 1d connected to the spoke portions 1c. A wall surface portion 1e to which the first horn plate 11 is fixed is provided in the main body 1. This configuration of the main body 1 is essentially similar to the conventional configuration, and is not limited to the illustrated configuration.

As illustrated in FIG. 1, the pad unit 2 is a component that is provided at almost the center of the steering wheel SW to store an airbag 22. The pad unit 2 is generally molded from resin, and can tear at a thin part provided on a back surface upon inflation and deployment of the airbag 22. The pad unit 2 also includes a wall surface portion 23 to which the second horn plate 21 is fixed, and a support portion 24 in contact with the second horn plate 21. Further, an inflator 25 for supplying gas to the airbag 22 is fixed to almost the center of the second horn plate 21 that is fixed to the pad unit 2. The airbag 22 is fixed to the second horn plate 21 together with the inflator 25, and is stored in a folded state in the pad unit 2. The airbag 22 may be wrapped in a wrapping sheet 26. The second horn plate 21 does not always need to be a discrete component, and may be formed by a retainer that holds the inflator 25.

As illustrated in FIG. 1, the first horn plate 11 includes a first flat portion 11a the guide pins 12 penetrate, a second flat portion 11b on which fixed contacts 3a of the horn switch 3 are provided, and a side wall portion 11c that connects the first flat portion 11a and the second flat portion 11b. The side wall portion 11c is fixed to the wall surface portion 1e of the main body 1 by fixtures such as rivets.

As illustrated in FIG. 1, the second horn plate 21 includes a first flat portion 21a to which the inflator 25 is fixed and on which the guide pins 12 stand, a second flat portion 21b on which movable contacts 3b of the horn switch 3 are provided, and a side wall portion 21c that connects the first flat portion 21a and the second flat portion 21b. The side wall portion 21c is fixed to the wall surface portion 23 of the pad unit 2 by fixtures such as rivets.

The main body 1 and the pad unit 2 described above can be moved with reduced vibration in the axial direction of the steering shaft S by a dynamic damper constituted by the guide pins 12, the stoppers 13, the insulators 14, the elastic bodies 15, the protectors 16, and the coil springs 17. The structure of the dynamic damper will be described in detail below with reference to FIGS. 2 to 6.

As illustrated in FIG. 2, each guide pin 12 is shaped like a nut formed integrally with the corresponding stopper 13, and is fixed to the second horn plate 21 while a fixing member 18, such as a bolt, is screwed therein to clamp the second horn plate 21. The stopper 13 is formed by a flange portion formed integrally with a distal end of the guide pin 12 and having a diameter larger than that of the guide pin 12. For example, a washer 19 may be interposed between the stopper 13 and the corresponding insulator 14.

The insulator 14 is a member that slides along the guide pin 12 while holding the corresponding elastic body 15. The insulator 14 has a cross section of a substantially H-shape turned sideways, and clamps the elastic body 15 between the first flange portion 14a and the second flange portion 14b. This insulator 14 may be an integrally molded component including the first flange portion 14a and the second flange portion 14b, or may be a component formed by assembling a plurality of components. The insulator 14 illustrated in FIG. 2 is divided into a first insulator 141 having the first flange portion 14a, and a second insulator 142 having the second flange portion 14b.

As illustrated in FIGS. 3(A) to 3(D), the first insulator 141 includes the first flange portion 14a, and first leg portions 14d extending from the first flange portion 14a toward the second flange portion 14b and provided along the guide pin 12. At the center of the first insulator 141, an opening 14e is provided such that the guide pin 12 is inserted therein.

As illustrated in FIG. 3(A), a surface of the first flange portion 14a has a plurality of irregularities 14f. While the irregularities 14f are formed by a lattice-shaped projection here, they are not limited thereto, and may be formed by, for example, a lattice-shaped depression, a mesh-shaped projection or depression, parallel lines of projections or depressions, an array of a plurality of dot-shaped projections or depressions, or a plurality of dot-shaped projections or depressions dispersed arbitrarily. By forming these irregularities 14f, the first flange portion 14a can be restricted from sticking to the guide pin 12, the washer 19, etc., and the occurrence of abnormal noise and breakage of the insulator 14 can be suppressed.

The first flange portion 14a of the first insulator 141 has, in its peripheral portion, indentations 14g engageable with columnar projections 16e of the corresponding protector 16 (see FIG. 6). By forming these indentations 14g, the protector 16 and the first insulator 141 can be engaged in the circumferential direction. This can restrict the rotation of the first insulator 141 (that is, the insulator 14), and can suppress abrasion of the insulator 14 and the elastic body 15.

The first flange portion 14a of the first insulator 141 also has, in its peripheral portion, cutouts 14h through which claws 16f of the protector 16 (see FIG. 6) engaged with the first horn plate 11 are visible in plan view. By forming these cutouts 14h, an assembly state of the dynamic damper can be checked easily.

The first flange portion 14a of the first insulator 141 further includes through holes 14i through which the elastic body 15 assembled to the insulator 14 is visible. By forming these through holes 14*i*, an assembly state of the elastic body 15 can be checked easily.

As illustrated in FIG. 3(B), a plurality of linear projections 14*c* are provided on a back surface of the first flange portion 14*a*. For example, while the linear projections 14*c* are radially arranged in portions of the first flange portion 14*a* having the maximum diameter D1, the arrangement is not limited to the illustrated arrangement. Short linear projections may be added in other portions of the back surface of the first flange portion 14*a*, or all of the linear projections do not always need to be arranged radially. The first flange portion 14*a* has a radial width Rf1 in the portions having the maximum diameter D1.

As illustrated in FIGS. 3(B) and 3(C), the linear projections 14*c* are projections of substantially semicircular cross section having a length L, a width w, and a height h. By appropriately adjusting the number, length L, width w, or height h of the linear projections 14*c*, the linear projections 14*c* are structured to bite the elastic body 15 so that a desired frictional force is produced. By adjusting this frictional force, the amplitude or frequency produced by vibration of the pad unit 2 can be controlled arbitrarily. The radial width Rf1 of the first flange portion 14*a* may be adjusted according to the required length L of the linear projections 14*c*. The width w of the linear projections 14*c* does not always need to be constant over the length L, and may be set to gradually increase or gradually decrease in a radial outer direction or to become the largest in a middle portion.

As illustrated in FIGS. 3(B) to 3(D), the first leg portions 14*d* stand on parts of a rim of the opening 14*e*, and have, at their distal ends, claws 14*j* engageable with the second insulator 142. While two first leg portions 14*d* are illustrated here, three or more second leg portions 14*k* may be provided. The first leg portions 14*d* are combined with second leg portions 14*k* of the second insulator 142, which will be described below, to form a substantially cylindrical portion along the guide pin 12.

As illustrated in FIGS. 4(A) to 4(C), the second insulator 142 includes the second flange portion 14*b*, and second leg portions 14*k* extending from the second flange portion 14*b* toward the first flange portion 14*a* and provided along the guide pin 12. At the center of the second insulator 142, an opening 141 is provided such that the guide pin 12 is inserted therein.

As illustrated in FIGS. 4(A) and 4(B), receiving portions 14*m* in which the first leg portions 14*d* of the first insulator 141 can be inserted are provided at the rim of the opening 141 of the second flange portion 14*b*. By inserting the first leg portions 14*d* of the first insulator 141 in the receiving portions 14*m* to assemble the first insulator 141 and the second insulator 142, a substantially cylindrical portion slidable along the guide pin 12 can be formed.

The second flange portion 14*b* of the second insulator 142 has through holes 14*n* through which the elastic body 15 assembled to the insulator 14 is visible. By forming these through holes 14*n*, an assembly state of the elastic body 15 can be checked easily.

As illustrated in FIGS. 4(A) and 4(C), spring guides 14*o* standing along the rim of the opening 141 are provided on a surface of the second flange portion 14*b* close to the coil spring 17. The corresponding coil spring 17 is fitted on outer peripheries of the spring guides 14*o*. The spring guides 14*o* may have claws (not illustrated) with which the fitted coil spring 17 engages.

As illustrated in FIGS. 4(B) and 4(C), the second leg portions 14*k* are provided along the opening 141 of the second flange portion 14*b*. While four second leg portions 14*k* are illustrated here, two, three, or five or more second leg portions 14*k* may be provided.

Stopper walls 14*p* contactable with a surface of the protector 16 may be provided in a peripheral portion of a surface of the second flange portion 14*b* close to the elastic body 15. These stopper walls 14*p* serve to ensure a fixed gap by contact with the surface of the protector 16 so that a load more than or equal to a predetermined load is not applied to the elastic body 15 when the elastic body 15 is pressed between the second flange portion 14*b* and the protector 16. The stopper walls 14*p* may have stepped portions on contact surfaces with the protector 16 so that the stopper walls 14*p* partly contact the protector 16.

A contact surface of the second flange portion 14*b* with the elastic body 15 (second diameter-increased portion 15*b*) has a plurality of dot-shaped projections 14*q*. By forming these dot-shaped projections 14*q*, a frictional force can be produced between the insulator 14 and the elastic body 15 at the second flange portion 14*b*, and this can help the frictional force produced in the first flange portion 14*a*. While the dot-shaped projections 14*q* are provided at four positions here, the layout and shape thereof are not limited to the illustrated ones, and the layout positions, number, diameter, etc. can be set arbitrarily.

As illustrated in FIG. 4(B), the second flange portion 14*b* is shaped like a disc having a diameter D2. This diameter D2 is set to be less than the maximum diameter D1 of the first flange portion 14*a*. Further, the second flange portion 14*b* has a radial width Rf2 in portions having the diameter D2. Therefore, the radial width Rf1 of the first flange portion 14*a* is set to include a part larger than the radial width Rf2 of the second flange portion 14*b* (for example, the portions having the maximum diameter D1). This structure can ensure a large area of the first flange portion 14*a* that has a great influence on the damper performance, and can produce a necessary frictional force between the insulator 14 and the elastic body 15. For example, the radial width Rf1 of the first flange portion 14*a* is set to be 1.5 times or more the radial width Rf2 of the second flange portion 14*b*, and preferably, set to be within the range of 1.5 to 2.0 times or the range of 1.5 to 3.0 times. The upper limit of the radial width Rf1 (or the maximum diameter D1) of the first flange portion 14*a* is determined by the shape and size of the first horn plate 11 on which the first insulator 141 is provided.

As illustrated in FIG. 2, the elastic body 15 is a rubber molded component fitted between the first flange portion 14*a* and the second flange portion 14*b* of the insulator 14 formed by the first insulator 141 and the second insulator 142.

As illustrated in FIGS. 5(A) to 5(C), the elastic body 15 has a substantially cylindrical flat shape, and includes a substantially cylindrical body portion 15*c*, a first diameter-increased portion 15*a* provided at an end of the body portion 15*c* close to the first flange portion 14*a*, and second diameter-increased portion 15*b* provided at an end of the body portion 15*c* close to the second flange portion 14*b*. At the center of the elastic body 15, an opening 15*d* is provided such that the first leg portions 14*d* and the second leg portions 14*k* of the insulator 14 can be inserted.

As illustrated in FIG. 5(A), the first diameter-increased portion 15*a* has, in its peripheral portion, indentations 15*e* engageable with the columnar projections 16*e* of the protectors 16 (see FIG. 6). For example, the indentations 15*e* have the same shape as that of the indentations 14*g* provided in the first flange portion 14*a* of the first insulator 141. By forming these indentations 15*e*, the protector 16 and the elastic body 15 can be engaged in the circumferential direction, rotation of the elastic body 15 can be restricted, and abrasion of the elastic body 15 can be suppressed.

The first diameter-increased portion 15a also has, in the peripheral portion, cutouts 15f through which the claws 16f of the protector 16 (see FIG. 6) engaged with the first horn plate 11 are visible in plan view. For example, the cutouts 15f have the same shape as that of the cutouts 14h provided in the first flange portion 14a of the first insulator 141. By forming these cutouts 15f, the assembly state of the dynamic damper can be checked easily.

The first diameter-increased portion 15a has the maximum diameter D1' in portions where the indentations 15e and the cutouts 15f are not provided. The maximum diameter D1' is set to be substantially equal to the maximum diameter D1 of the first flange portion 14a of the first insulator 141. That is, the first flange portion 14a of the first insulator 141 and the first diameter-increased portion 15a of the elastic body 15 substantially have the same shape, and are positioned by the claws 16f of the protector 16 so that their shapes thereof are aligned.

As illustrated in FIG. 5(B), the second diameter-increased portion 15b has, in its peripheral portion, cutouts 15g provided at positions corresponding to the cutouts 15f of the first diameter-increased portion 15a. The stopper walls 14p provided in the second flange portion 14b are placed in the cutouts 15g, and the stopper walls 14p can be in contact with the protector 16.

The second diameter-increased portion 15b has the maximum diameter D2' in portions where the cutouts 15g are not provided. The maximum diameter D2' is set to be substantially equal to the diameter D2 of the second flange portion 14b of the second insulator 142. That is, the second flange portion 14b of the second insulator 142 and the second diameter-increased portion 15b of the elastic body 15 substantially have the same shape.

The first diameter-increased portion 15a has a radial width Rw1 in the portions having the maximum diameter D1'. The second diameter-increased portion 15b has a radial width Rw2 in the portions having the maximum diameter D2'. The radial width Rw1 is substantially equal to the radial width Rf1 of the first flange portion 14a, and the radial width Rw2 is substantially equal to the radial width Rf2 of the second flange portion 14b. Therefore, the radial width Rw1 of the first diameter-increased portion 15a includes a part larger than the radial width Rw2 of the second diameter-increased portion 15b.

The radial width Rf1 of the first diameter-increased portion 15a is set to increase or decrease the contact area between the linear projections 14c of the first flange portion 14a and the elastic body 15 in order to produce a desired frictional force. Therefore, the amplitude or frequency produced by vibration of the pad unit 2 can be arbitrarily controlled by adjusting the radial width Rf1 of the first diameter-increased portion 15a.

As illustrated in FIG. 5(C), the first diameter-increased portion 15a has a thickness t. The first diameter-increased portion 15a is interposed between the insulator 14 and the protector 16. By adjusting the thickness t, the contact area between the linear projections 14c of the first flange portion 14a and the elastic body 15 can be increased or decreased to produce a desired frictional force. That is, the amplitude or frequency produced by vibration of the pad unit 2 can be arbitrarily controlled by adjusting the thickness t of the first diameter-increased portion 15a.

As illustrated in FIG. 2, the protector 16 is a member that protects the elastic body 15 from direct contact with the first horn plate 11. More specifically, the protector 16 is provided between the first diameter-increased portion 15a and the second diameter-increased portion 15b in the elastic body 15. By providing the protector 16, friction is not caused between the elastic body 15 and the first horn plate 11 when the dynamic damper vibrates or when the horn is sounded. This can effectively suppress abrasion of the elastic body 15.

As illustrated in FIGS. 6(A) to 6(D), the protector 16 has a substantially cylindrical flat shape as a whole, and includes a substantially cylindrical body portion 16a, a first expanded portion 16b provided at an end of the body portion 16a close to the first diameter-increased portion 15a, and a second expanded portion 16c provided at an end of the body portion 16a close to the second diameter-increased portion 15b. At the center of the protector 16, an opening 16d is provided such that the body portion 15c of the elastic body 15 can be inserted therein.

As illustrated in FIGS. 6(A) and 6(C), the protector 16 includes an expanded portion (first expanded portion 16b) expanded to be contactable with the first diameter-increased portion 15a, and columnar projections 16e standing on a surface of the expanded portion (first expanded portion 16b). The columnar projections 16e are engageable with the indentations 14g provided in the first flange portion 14a of the insulator 14 and the indentations 15e provided in the first diameter-increased portion 15a of the elastic body 15. These columnar projections 16e can restrict the rotations of the insulator 14 and the elastic body 15, and can suppress abrasion of the insulator 14 and the elastic body 15. As illustrated in FIG. 2, the columnar projections 16e are arranged to be contactable with the stopper 13. Even when the elastic body 15 is compressed between the stopper 13 and the first horn plate 11, the columnar projections 16e contact the stopper 13 so as not to apply an excessive load to the elastic body 15.

As illustrated in FIGS. 6(A), 6(C), and 6(D), the body portion 16a of the protector 16 has claws 16f engageable with the first horn plate 11. The first expanded portion 16b has cutouts 16g through which the claws 16f engaged with the first horn plate 11 are visible from the first expanded portion 16b side. These cutouts 16g substantially have the same shape as that of the cutouts 14h of the insulator 14 and the cutouts 15f of the elastic body 15. Therefore, even when the protector 16 is engaged with the first horn plate 11, the claws 16f are visible without being obstructed by the first flange portion 14a, the first diameter-increased portion 15a, and the first expanded portion 16b. This allows the assembly state to be checked easily.

As illustrated in FIGS. 6(C) and 6(D), the claws 16f are provided between the first expanded portion 16b and the second expanded portion 16c, and can be displaced in the radial direction by elastic force. While the claws 16f are provided at two outer peripheral positions of the body portion 16a here, they may be provided at three or more positions, and it is satisfactory as long as at least one claw 16f is visible. That is, the cutouts 14h, 15f, and 16g may be formed so that at least one claw 16f is visible.

As illustrated in FIGS. 6(A) to 6(C), a predetermined gap is formed in the axial direction of the body portion 16a between the first expanded portion 16b and the second expanded portion 16c, and the first horn plate 11 is attached in this gap. As illustrated in FIG. 6(A), the second expanded portion 16c may have contact portions 16h to be in contact with the first horn plate 11.

As illustrated in FIG. 2(A), the coil spring 17 is inserted between the insulator 14 and the second horn plate 21, and is in contact with the second flange portion 14b of the insulator 14 to bias the insulator 14 in a direction to be pressed against the stopper 13. As described above, since the elastic body 15 is fitted on the outer periphery of the insulator 14 and the protector 16 is fitted on the outer periphery of the elastic body 15, the elastic body 15 is not compressed by the biasing force of the coil spring 17. Hence, the load applied to the elastic body 15 can be reduced, and the life of the elastic body 15 can be lengthened. In particular, since the insulator 14 is divided into the first insulator 141 and the second insulator 142 and the first leg portions 14d of the first insulator 141 are contactable with the stopper 13 or the washer 19, the biasing force of the coil spring 17 can be received by the first leg portions 14d. This can effectively reduce the load applied to the elastic body 15.

As illustrated in FIG. 2(B), when the horn is sounded, the pad unit 2 is pressed, and therefore, the second horn plate 21 is moved in a direction of arrows. At this time, the insulator 14 is engaged with the first horn plate 11 that is fixed to the main body 1 with the protector 16 being disposed therebetween, and the guide pin 12 is fixed to the second horn plate 21. Hence, the guide pin 12 moves in the direction of the arrows while sliding in the insulator 14 along with the movement of the second horn plate 21. When the movable contacts 3b provided on the second horn plate 21 are brought into contact with the fixed contacts 3a provided on the first horn plate 11 illustrated in FIG. 1, the horn switch 3 is actuated to produce a sound.

When the horn is thus sounded, the insulator 14 (second insulator 142) pressed by the coil spring 17 can also reduce the load applied to the elastic body 15 because the stopper walls 14p contact the protector 16.

Figure 7A:
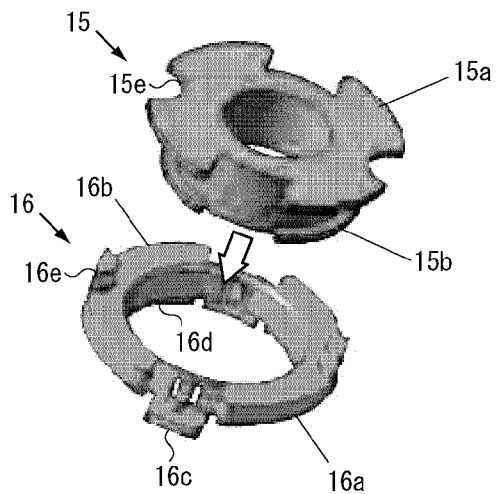
FIG. 7(A) illustrates an assembly step of the elastic body.
Figure 7B:
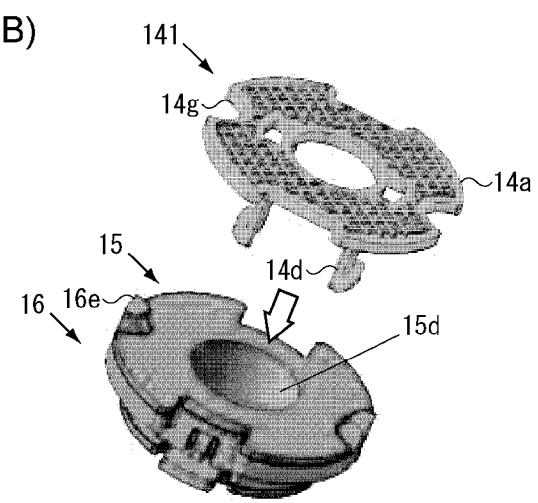
FIG. 7(B) illustrates an assembly step of the first insulator.
Figure 7C:
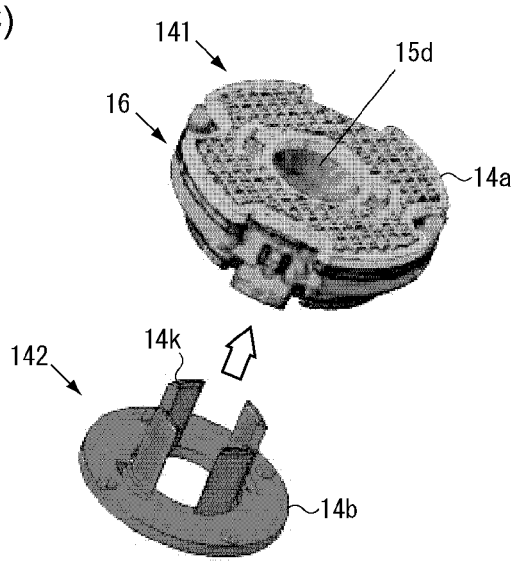
FIG. 7(C) illustrates an assembly step of the second insulator.

Next, a description will be given of an assembly method for the above-described dynamic damper. Here, FIG. 7 includes views illustrating assembly steps of the dynamic damper illustrated in FIG. 1, wherein FIG. 7(A) illustrates an assembly step of the elastic body, FIG. 7(B) illustrates an assembly step of the first insulator, and FIG. 7(C) illustrates an assembly step of the second insulator. (A) and (B) are detailed views of the first horn plate illustrated in FIG. 1. (A) is a plan view of the first horn plate before the damper is assembled, and (B) is a plan view of the first horn plate after the damper is assembled.

First, as illustrated in FIG. 7(A), the elastic body 15 is assembled to the protector 16. More specifically, the elastic body 15 is inserted into the opening 16d of the protector 16, and is assembled so that the first diameter-increased portion 15a of the elastic body 15 is placed on the surface of the first expanded portion 16b of the protector 16 and the second diameter-increased portion 15b of the elastic body 15 is placed on an end face of the body portion 16a of the protector 16. At this time, alignment is performed so that the columnar projections 16e of the protector 16 are located in the indentations 15e of the elastic body 15.

Next, as illustrated in FIG. 7(B), the first insulator 141 is assembled to an assembled body of the protector 16 and the elastic body 15. More specifically, the first leg portions 14d of the first insulator 141 are inserted in the opening 15d of the elastic body 15. At this time, alignment is performed so that the columnar projections 16e of the protector 16 are located in the indentations 14g of the first insulator 141.

Next, as illustrated in FIG. 7(C), the second insulator 142 is assembled to an assembled body of the protector 16, the elastic body 15, and the first insulator 141. More specifically, the second leg portions 14k of the second insulator 142 are inserted in the opening 15d of the elastic body 15, and the claws 14j are engaged with the surface of the second flange portion 14b. At this time, alignment is performed so that the first leg portions 14d of the first insulator 141 are located in the receiving portions 14m of the second insulator 142.

Through these steps, the assembled body can be formed by the insulator 14, the elastic body 15, and the protector 16. This assembled body may be assembled as a unit before being connected to the first horn plate 11. Alternatively, after the protector 16 is connected to the first horn plate 11, the elastic body 15 and the insulator 14 may be assembled in order. The assembly step of the first insulator 141 and the assembly step of the second insulator 142 may be performed in reverse order.

Figure 8A:
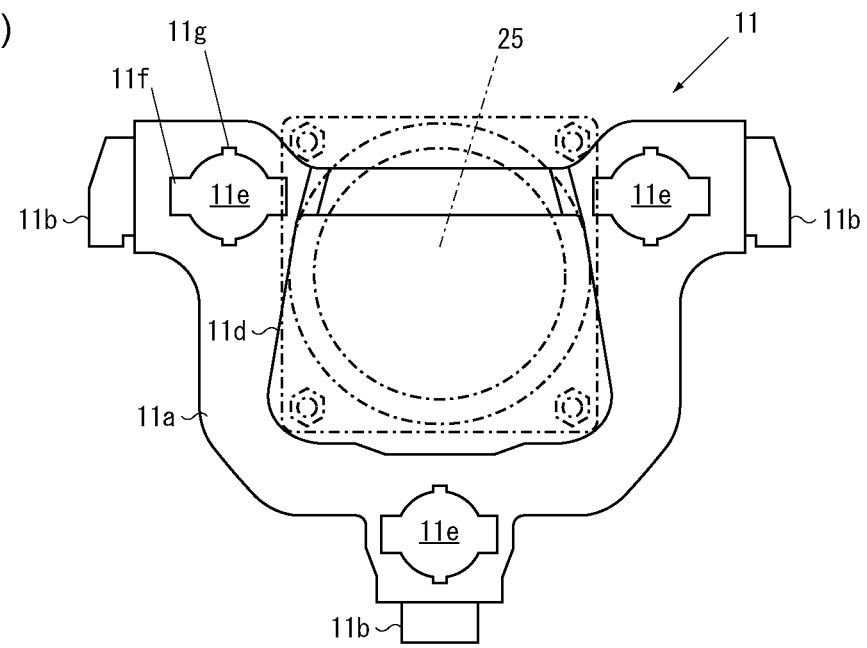
FIG. 8(A) is a plan view illustrating a state before the damper is assembled.

As illustrated in FIG. 8(A), the first horn plate 11 with which the protectors 16 are engaged includes a first flat portion 11a in which the guide pins 12 are inserted, second flat portions 11b on which the fixed contacts 3a of the horn switch 3 are provided, and an opening 11d in which the inflator 25 is provided. The first flat portion 11a has a plurality of engaging holes 11e with which the protectors 16 engage. The engaging holes 11e include cutouts 11f in which the second expanded portions 16c of the protectors 16 can be inserted, and notches 11g engageable with the claws 16f of the protectors 16. The layout and numbers of cutouts 11f and notches 11g are set in accordance with the layout and number of the second expanded portions 16c and the claws 16f of the protectors 16. For example, the engaging holes 11e are provided at 2 o'clock, 6 o'clock, and 10 o'clock positions around the opening 11d.

Figure 8B:
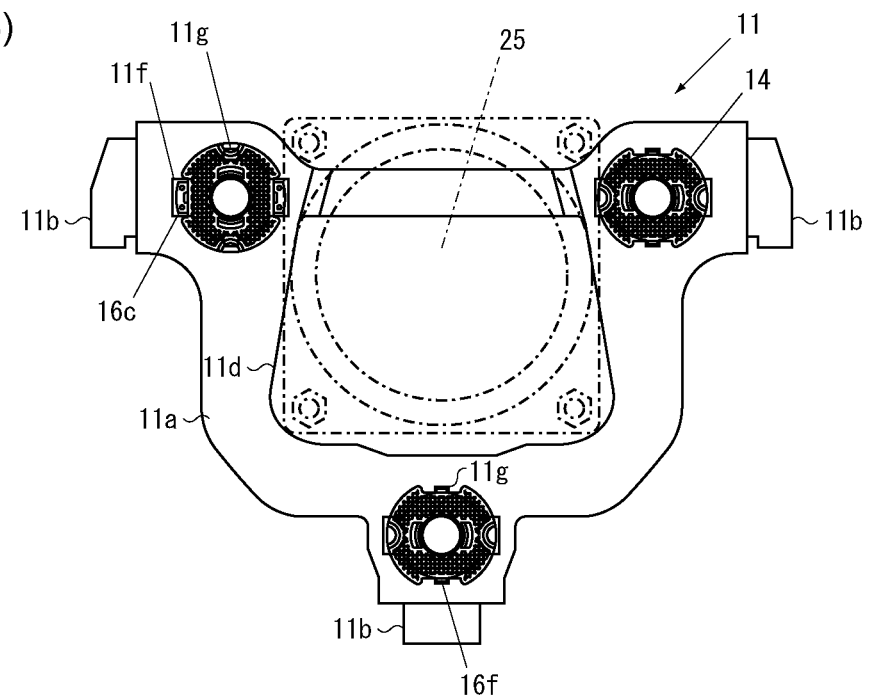
FIG. 8(B) is a plan view illustrating a state after the damper is assembled.

As illustrated in FIG. 8(B), to engage assembled bodies of the insulators 14, the elastic bodies 15, and the protectors 16 with the engaging holes 11e of the first horn plate 11, the second expanded portions 16c of the protectors 16 are inserted in the cutouts 11f of the engaging holes 11e (for example, a state in the upper left engaging hole 11e in the figure), and the assembled bodies (protectors 16) are turned 90°, whereby the claws 16f of the protectors 16 are engaged with the notches 11g of the engaging holes 11e (for example, a state in the upper right engaging hole 11e in the figure). At this time, since the insulators 14, the elastic bodies 15, and the protectors 16 in the assembled bodies have the cutouts 14h, 15f, and 16g, respectively, the claws 16f engaged with the notches 11g can be checked visually. Therefore, the assembly state of the assembled bodies can be checked easily.

According to the above-described steering wheel SW of the first embodiment, each elastic body 15 does not directly contact the stopper 13 of the guide pin 12, the first horn plate 11, the second horn plate 21, and the coil spring 17. This can reduce the load applied to the elastic body 15 and abrasion, and can lengthen the life of the dynamic damper. Further, since the contact between the insulator 14 and the elastic body 15 is made using the linear projections 14c, a frictional force can be effectively produced between the insulator 14 and the elastic body 15. In addition, by adjusting any of the radial widths Rf1 and Rw1 of the first flange portion 14a and the first diameter-increased portion 15a, the thickness t of the first diameter-increased portion 15a, and the number, length L, height h, and width w of the linear projections 14c, the contact area between the insulator 14 and the elastic body 15 can be controlled, the frictional force produced between the insulator 14 and the elastic body 15 can be adjusted easily, and the frequency of the dynamic damper can be adjusted easily.

Figure 9A:
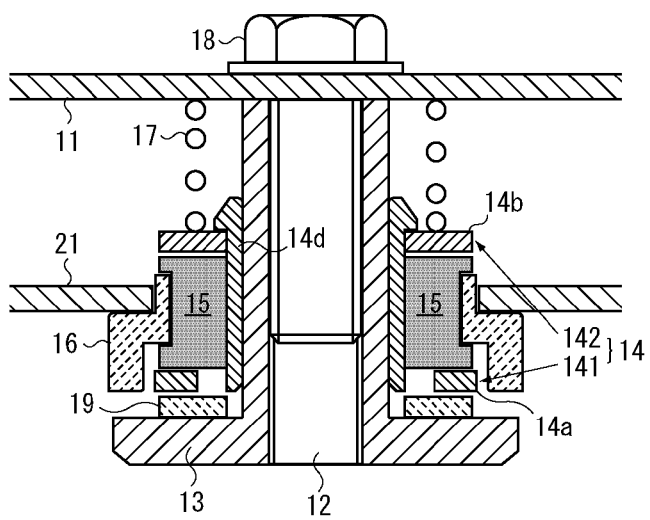
FIG. 9(A) illustrates a second embodiment.
Figure 9B:
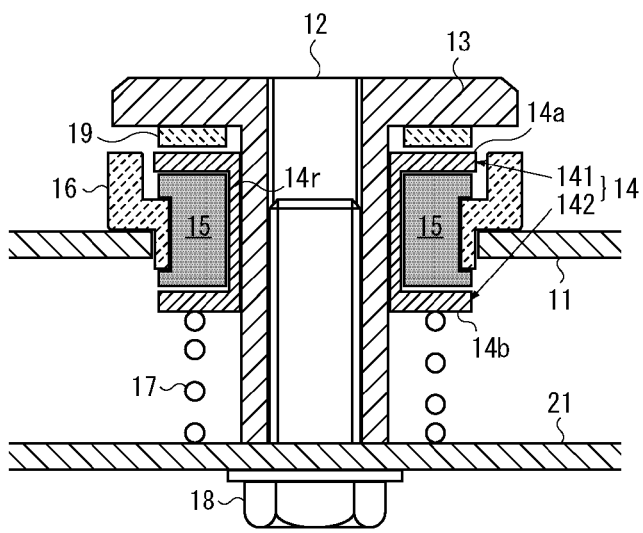
FIG. 9(B) illustrates a third embodiment.
Figure 9C:
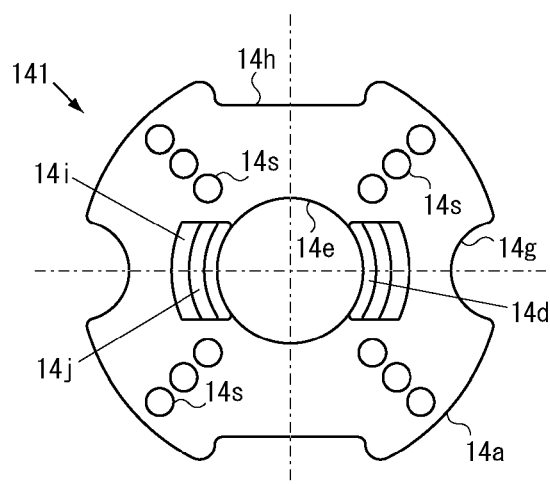
FIG. 9(C) illustrates a fourth embodiment.

Next, descriptions will be given of steering wheels SW according to other embodiments of the present invention. FIG. 9 includes views of steering wheels according to other embodiments of the present invention, wherein FIG. 9(A) illustrates a second embodiment, FIG. 9(B) illustrates a third embodiment, and FIG. 9(C) illustrates a fourth embodiment. The same constituent components as those adopted in the first embodiment are denoted by the same reference numerals, and redundant descriptions thereof are skipped.

In the second embodiment illustrated in FIG. 9(A), the dynamic damper illustrated in FIG. 1 is inverted in the up-down direction. More specifically, a guide pin 12 stands on a first horn plate 11, and a stopper 13 is provided on a second horn plate 21. This structure also provides advantages similar to those of the steering wheel SW of the first embodiment.

In the third embodiment illustrated in FIG. 9(B), a first flange portion 14a and a second flange portion 14b of an insulator 14 are molded as an integral structure. More specifically, the insulator 14 includes a body portion 14r to be inserted in an elastic body 15, a first flange portion 14a provided on a side of the body portion 14r close to a stopper 13, and a second flange portion 14b provided on a side of the body portion 14r close to a coil spring 17. This structure is different only in an assembly method, and also provides advantages similar to those of the steering wheel SW of the first embodiment.

In the fourth embodiment illustrated in FIG. 9(C), linear projections 14c are each formed by a plurality of dot-shaped projections 14s arranged in a line. Such dot-shaped projections 14s can form projections like a dotted line, substantially have a structure equivalent to that of the linear projections 14c, and provide advantages similar to those of the linear projections 14c. All the dot-shaped projections 14s do not need to be equal in diameter. The diameter may be set to gradually increase or gradually decrease in a radial outer direction or to become the largest in a middle portion.

The present invention is not limited to the above-described embodiments, and various changes can be made without departing from the scope of the present invention, for example, the first to fourth embodiments can be combined appropriately.

REFERENCE SIGNS LIST 1 main body
2 pad unit
3 horn switch
11 first horn plate
12 guide pin
13 stopper
14 insulator
14a first flange portion
14b second flange portion
14c linear projection
14d first leg portion
14f irregularities
14g indentation
14i, 14n through hole
14k second leg portion
14q, 14s dot-shaped projection
15 elastic body
15a first diameter-increased portion
15b second diameter-increased portion
15e indentation
16 protector
16b first expanded portion
16c second expanded portion
16e columnar projection
16f claw
16g cutout
17 coil spring
21 second horn plate
141 first insulator
142 second insulator

The invention claimed is:

1. A steering wheel including a main body assembled on a steering shaft for converting a rotating action into a steering action, and a pad unit provided at almost the center of the main body, the pad unit being assembled to the main body such as to be movable in an axis direction of the steering shaft, and a horn switch being provided between the main body and the pad unit,
    wherein the steering wheel comprises a first horn plate fixed to the main body, a second horn plate fixed to the pad unit, a guide pin standing on one of the first horn plate and the second horn plate, a stopper provided at a distal end of the guide pin, an insulator inserted slidably along the guide pin, an elastic body fitted on an outer periphery of the insulator, a protector fitted on an outer periphery of the elastic body and provided engageably with the other of the first horn plate and the second horn plate, and a coil spring fitted on the guide pin to bias the insulator toward the stopper,
    wherein the insulator includes a first flange portion provided between the stopper and the elastic body, and a second flange portion provided between the coil spring and the elastic body, and the elastic body includes a first diameter-increased portion increased in diameter to be contactable with the first flange portion, and a second diameter-increased portion increased in diameter to be contactable with the second flange portion, and
    wherein a contact surface of the first flange portion with the first diameter-increased portion has a plurality of linear projections arranged in a substantially radial fashion, and
    wherein an amplitude or frequency produced by vibration of the pad unit is controlled by adjusting any of radial widths of the first flange portion and the first diameter-increased portion, a thickness of the first diameter-increased portion, a number, a length, a height, and a width of the linear projections.

2. The steering wheel according to claim 1, wherein radial widths of the first flange portion and the first diameter-increased portion include parts larger than radial widths of the second flange portion and the second diameter-increased portion.

3. The steering wheel according to claim 1, wherein a contact surface of the second flange portion with the second diameter-increased portion has a plurality of dot-shaped projections.

4. The steering wheel according to claim 1, wherein a surface of the first flange portion close to the stopper has a plurality of irregularities.

5. The steering wheel according to claim 1, wherein the insulator is divided into a first insulator including the first flange portion and a first leg portion extending from the first flange portion toward the second flange portion and provided along the guide pin, and a second insulator including the second flange portion and a second leg portion extending from the second flange portion toward the first flange portion and provided along the guide pin.

6. The steering wheel according to claim 1, wherein the protector includes an expanded portion expanded to be contactable with the first diameter-increased portion and a columnar projection standing on a surface of the expanded portion, and the first flange portion and the first diameter-increased portion have indentations engageable with the columnar projection.

7. The steering wheel according to claim 1, wherein the protector has, on an outer peripheral surface, a claw engageable with the first horn plate or the second horn plate, and the expanded portion, the first flange portion, and the first diameter-increased portion have cutouts through which the claw engaged with the first horn plate or the second horn plate is visible.

8. The steering wheel according to claim 1, wherein the first flange portion and the second flange portion have through holes through which the assembled elastic body is visible.

* * * * *